(12) United States Patent
Anders, Jr.

(10) Patent No.: US 8,051,370 B2
(45) Date of Patent: Nov. 1, 2011

(54) INTELLIGENT AUTOCOMPLETION

(75) Inventor: Billy R. Anders, Jr., Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 463 days.

(21) Appl. No.: 12/108,496

(22) Filed: Apr. 23, 2008

(65) Prior Publication Data

US 2009/0271744 A1    Oct. 29, 2009

(51) Int. Cl.
*G06F 17/00* (2006.01)
(52) U.S. Cl. ........................................................ 715/205
(58) Field of Classification Search .................. 715/200, 715/205, 206
See application file for complete search history.

(56) References Cited

U.S. PATENT DOCUMENTS

| | | | |
|---|---|---|---|
| 5,958,008 A | | 9/1999 | Pogrebisky et al. |
| 6,029,182 A * | | 2/2000 | Nehab et al. ............... 715/205 |
| 6,035,330 A * | | 3/2000 | Astiz et al. ................. 709/218 |
| 6,148,311 A | | 11/2000 | Wishnie et al. |
| 6,175,833 B1 * | | 1/2001 | West et al. .................. 707/661 |
| 6,360,235 B1 * | | 3/2002 | Tilt et al. .................... 715/205 |
| 6,397,259 B1 * | | 5/2002 | Lincke et al. ............... 709/236 |
| 6,470,383 B1 | | 10/2002 | Leshem et al. |
| 6,525,748 B1 | | 2/2003 | Belfiore et al. |
| 6,623,529 B1 * | | 9/2003 | Lakritz ....................... 715/205 |
| 6,701,363 B1 * | | 3/2004 | Chiu et al. .................. 709/224 |
| 6,714,931 B1 * | | 3/2004 | Papierniak et al. ............. 1/1 |
| 6,769,015 B1 * | | 7/2004 | Bates et al. ................. 709/206 |
| 6,954,901 B1 * | | 10/2005 | Desai et al. ................ 715/745 |
| 6,957,383 B1 * | | 10/2005 | Smith ......................... 715/207 |
| 6,961,731 B2 * | | 11/2005 | Holbrook .......................... 1/1 |
| 7,107,536 B1 | | 9/2006 | Dowling |
| 7,127,723 B2 * | | 10/2006 | Endo et al. ................. 719/319 |
| 7,149,743 B2 * | | 12/2006 | Colwill, Jr. ....................... 1/1 |
| 7,296,222 B1 | | 11/2007 | Sakairi |
| 7,415,696 B2 * | | 8/2008 | Cohen et al. ............... 717/100 |
| 7,603,617 B2 * | | 10/2009 | Henning et al. ............ 715/206 |
| 2002/0059209 A1 * | | 5/2002 | Kung ............................. 707/3 |
| 2002/0194151 A1 * | | 12/2002 | Fenton et al. .................. 707/1 |
| 2003/0050916 A1 * | | 3/2003 | Ortega et al. ................. 707/1 |
| 2003/0126139 A1 * | | 7/2003 | Lee et al. .................... 707/100 |
| 2003/0163519 A1 * | | 8/2003 | Kegel et al. ................ 709/203 |
| 2003/0187925 A1 * | | 10/2003 | Inala et al. ................. 709/204 |
| 2003/0204811 A1 * | | 10/2003 | Dam et al. .................. 715/500 |
| 2004/0254913 A1 * | | 12/2004 | Bernstein et al. ............. 707/2 |

(Continued)

FOREIGN PATENT DOCUMENTS

JP    2002163296    6/2002

OTHER PUBLICATIONS

Tiemessen, Website Context and History: An Overview and Design Proposal, Google 2004, pp. 1-8.*

(Continued)

*Primary Examiner* — Cong-Lac Huynh

(57) ABSTRACT

Various embodiments utilize an auto-complete module to expose a website's content structure. In at least some embodiments, a user can take an action within an application and, responsively, the auto-complete module can retrieve a site index file or site map and use the site index file or site map to display the website's content structure. In at least some embodiments, a website's content structure can be displayed without navigating to the particular website. In at least some embodiments, the auto-complete module can utilize standard protocols such as HTTP protocols to retrieve the site index file or site map.

20 Claims, 10 Drawing Sheets

U.S. PATENT DOCUMENTS

| | | | |
|---|---|---|---|
| 2005/0028089 A1* | 2/2005 | Aoki et al. | 715/513 |
| 2005/0050029 A1* | 3/2005 | Suzuki | 707/3 |
| 2005/0125535 A1* | 6/2005 | Gatt | 709/225 |
| 2005/0149561 A1* | 7/2005 | Hodnett et al. | 707/104.1 |
| 2005/0278351 A1 | 12/2005 | Niyogi et al. | |
| 2006/0036966 A1* | 2/2006 | Yevdayev | 715/779 |
| 2006/0085746 A1* | 4/2006 | Kobayashi et al. | 715/530 |
| 2006/0101330 A1 | 5/2006 | Godley | |
| 2006/0123038 A1* | 6/2006 | Fenton et al. | 707/101 |
| 2006/0161535 A1* | 7/2006 | Holbrook | 707/3 |
| 2006/0200751 A1* | 9/2006 | Underwood et al. | 715/501.1 |
| 2007/0094267 A1 | 4/2007 | Good et al. | |
| 2007/0124506 A1* | 5/2007 | Brown et al. | 709/252 |
| 2007/0124701 A1* | 5/2007 | Gong et al. | 715/854 |
| 2007/0174143 A1 | 7/2007 | Smilowitz et al. | |
| 2007/0226640 A1* | 9/2007 | Holbrook et al. | 715/765 |
| 2007/0233692 A1* | 10/2007 | Lisa et al. | 707/10 |
| 2007/0239739 A1 | 10/2007 | Tanzy | |
| 2007/0245260 A1* | 10/2007 | Koppert | 715/784 |
| 2007/0250295 A1* | 10/2007 | Murray et al. | 703/2 |
| 2007/0257792 A1* | 11/2007 | Gold | 340/539.2 |
| 2008/0005127 A1 | 1/2008 | Schneider | |
| 2008/0133500 A1* | 6/2008 | Edwards et al. | 707/5 |
| 2008/0134015 A1* | 6/2008 | Milic-Frayling et al. | 715/206 |
| 2009/0132937 A1* | 5/2009 | Allen et al. | 715/762 |
| 2009/0319481 A1* | 12/2009 | Chitrapura et al. | 707/3 |
| 2010/0131392 A1* | 5/2010 | Archer et al. | 705/27 |
| 2011/0047014 A1* | 2/2011 | De Angelo | 705/14.4 |

OTHER PUBLICATIONS

Chen et al., Bringing Order to the Web: Automatically Categorizing Search Results, ACM 2000, pp. 145-152.*

Cooley, The Use of Web Structure and Content to Identify Subjectively Interesting Web Usage Patterns, ACM 2003, pp. 99-116.*

Farris et al., Users' Schemata of Hypermedia: What Is so Spatial about a Website?, Google 2002, pp. 487-502.*

Pilgrim, Trends in Sitemap Designs—A Taxonomy and Survey, Google 2007, pp. 95-102.*

Millic-Frayling et al., SmartBack: Supporting Users in Back Navigation, ACM 2004, pp. 63-71.*

Tullis et al., A Study of Website Navigation Methods, Google 2005, pp. 1-7.*

"PCT Search Report and Written Opinion", Application No. PCT/US2009/037917, (Jan. 11, 2010), 11 pages.

Trapani, "Enable Firefox Address Bar Auto-completion", Oct. 22, 2007, p. 1.

"Sitemap_Generator", 2004,2005, googlesitemapwizard.com, p. 1.

* cited by examiner

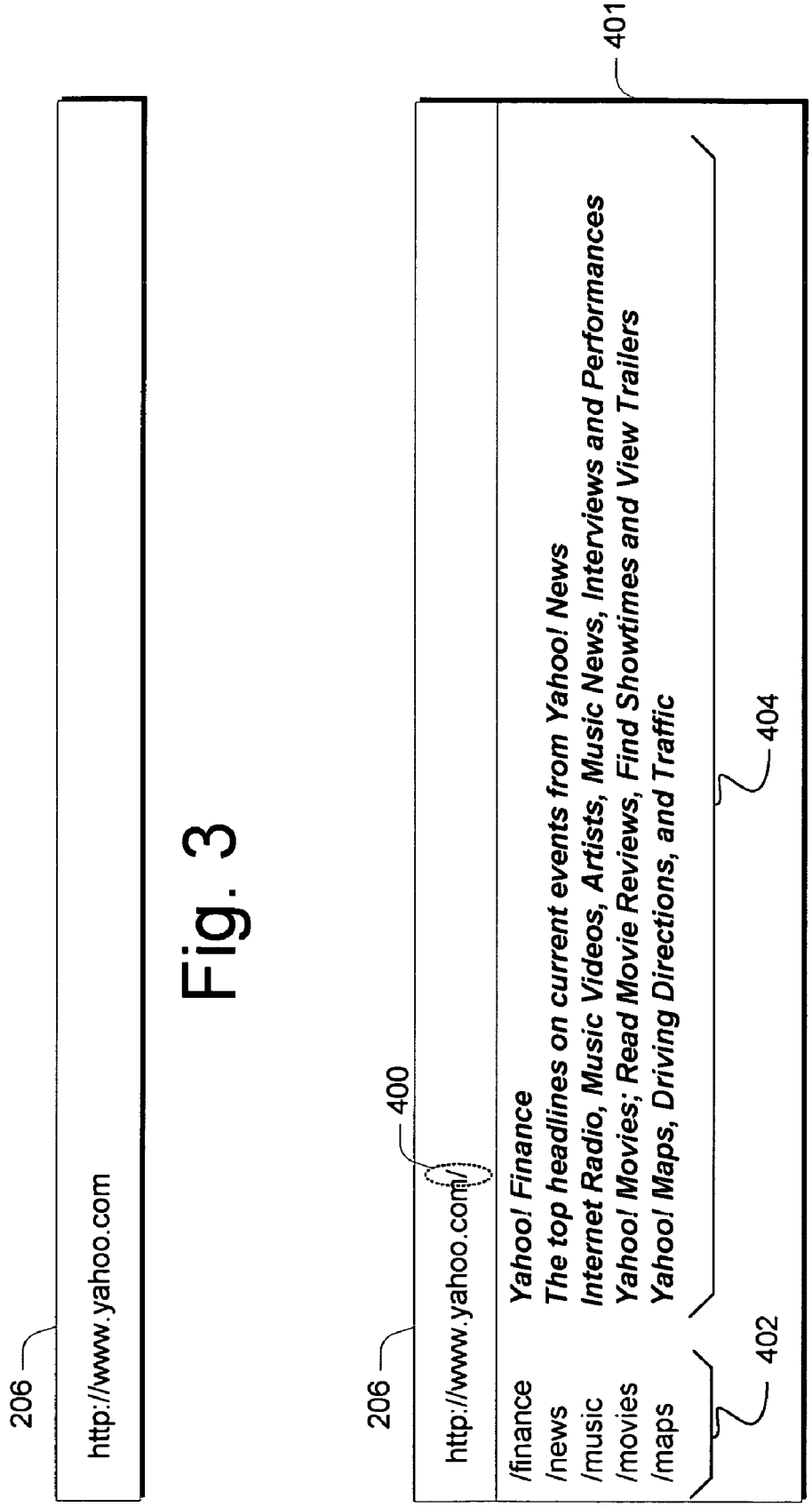

Billy Anders

From: Lance Sadler
Sent: April 4, 2008 9:53 AM
To: Billy Anders
Subject: New Web Site Hey Billy, Check out this new web site that I found. Lots of good music downloads available.....

www.greatmusicdownloads.com ← 902

Fig. 9

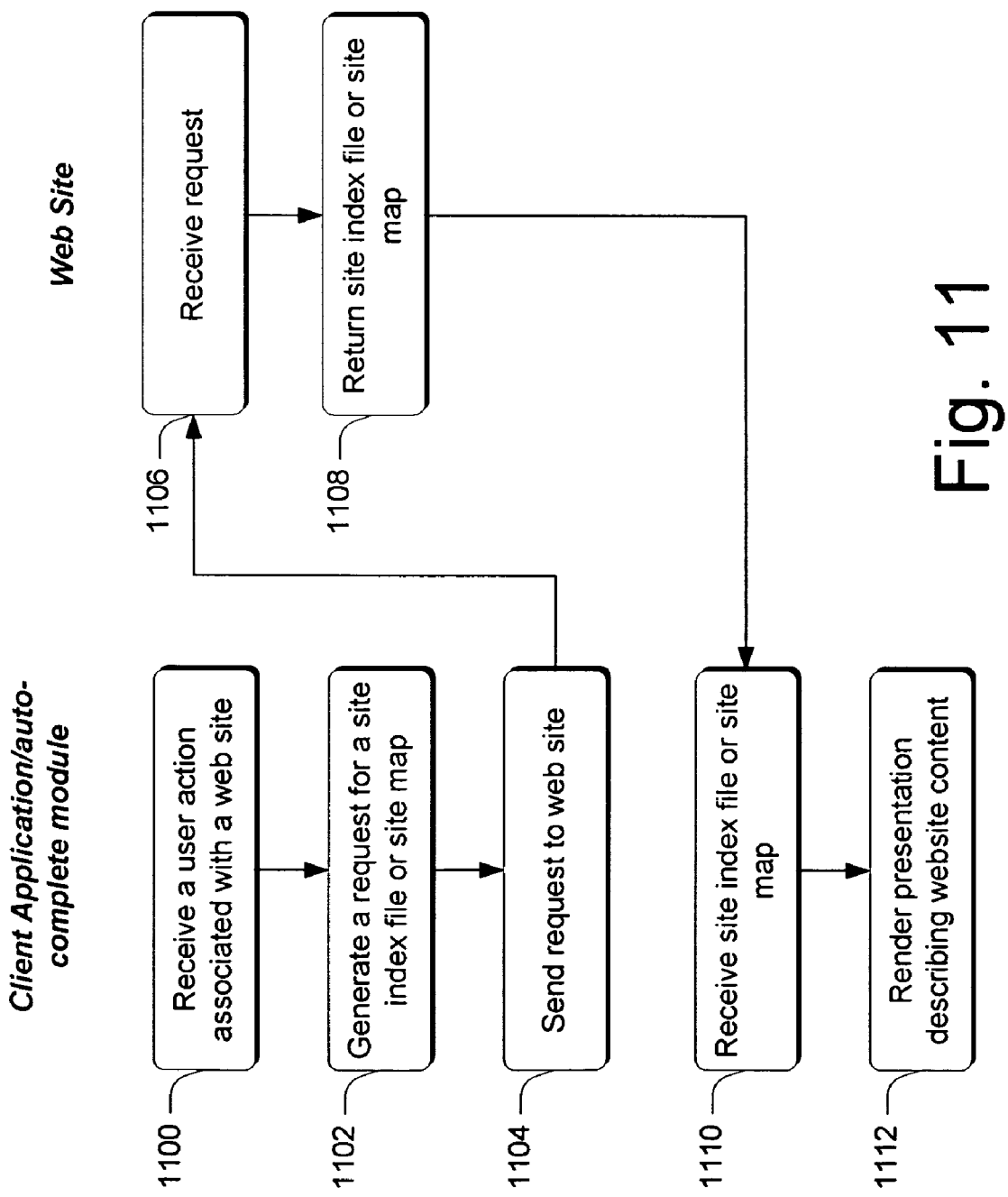

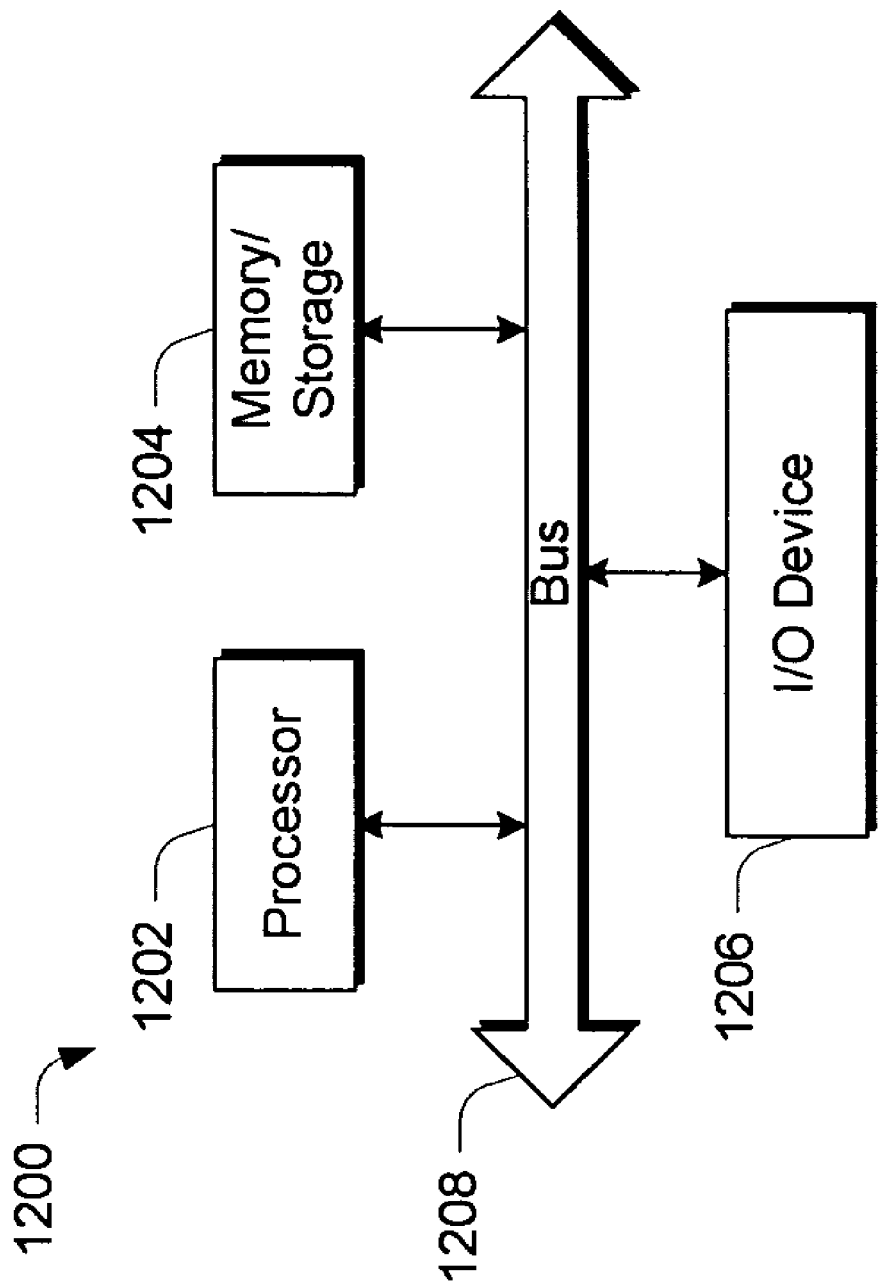

though not illustrated, computing device 102 can include a display device on which web browser 110 can render content for a user.

INTELLIGENT AUTOCOMPLETION

BACKGROUND

With the proliferation of online browsing and other activities involving the Internet, users are faced with a daunting task of identifying content that may be of interest to them. For example, if a user navigates to a particular website, they must often either parse through the content on the website to find items of interest or use the website's site index to ascertain what content is available at that site. In the former case, the user must navigate to and physically look through various content at the website. In the latter case, the user must first locate the website's site index, if there is one, and then navigate through the site index to locate content of interest.

Needless to say, this places a significant burden on the user. In addition, in scenarios in which a user might be employing a hand-held device, such as a cellular phone to navigate the web, latency issues associated with rendering content on the device can further bog down the user's experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments utilize an auto-complete module to expose a website's content structure. In at least some embodiments, a user can take an action within an application and, responsively, the auto-complete module can retrieve a site index file or site map and use the site index file or site map to display the website's content structure. In at least some embodiments, a website's content structure can be displayed without navigating to the particular website.

In at least some embodiments, the auto-complete module can utilize standard protocols such as HTTP protocols to retrieve the site index file or site map.

BRIEF DESCRIPTION OF THE DRAWINGS

The same numbers are used throughout the drawings to reference like features.

FIG. 3 illustrates an example address bar from the FIG. 2 web browser.

FIG. 4 illustrates the FIG. 3 address bar in accordance with one or more embodiments.

FIG. 9 illustrates a user interface in accordance with one or more embodiments.

FIG. 11 is a flow diagram that describes steps in a method in accordance with one or more embodiments.

FIG. 12 illustrates an example system that can be used to implement one or more embodiments.

DETAILED DESCRIPTION

Overview

Various embodiments utilize an auto-complete module to expose a website's content structure. In at least some embodiments, a user can take an action within an application and, responsively, the auto-complete module can retrieve a site index file or site map and use the site index file or site map to display the website's content structure. In at least some embodiments, a website's content structure can be displayed without navigating to the particular website. The auto-complete module can be utilized by any suitable type of application such as, by way of example and not limitation, Web browsers, RSS readers, media player applications, e-mail applications, and/or any other type of Internet-based application examples of which are provided below.

In at least some embodiments, the auto-complete module can utilize standard protocols, such as HTTP protocols, to retrieve the site index file or site map. Once the site index file or site map is retrieved, the file or map can be parsed to identify a structure that is described in the file or map. Once identified, a representation of the structure can be rendered for the user so that the user can ascertain site categories, content descriptions, and other information associated with the website. As noted above, the structure's representation can be rendered for the user without navigating to the particular website. However, it is to be appreciated and understood that the functionality described herein can be provided once a user has navigated to a particular website, as will become apparent below.

In the discussion that follows, a section entitled "Operating Environment" is provided and describes one environment in which one or more embodiments can be employed. Following this, a section entitled "Example Embodiment" is provided and describes an example embodiment. Following this, a section entitled "Example Method" describes a method in accordance with one or more embodiments. Last, a section entitled "Example System" is provided and describes one system that can be utilized to implement one or more embodiments.

Having provided an overview of the various embodiments, consider now a discussion of an example operating environment in accordance with one or more embodiments.

Operating Environment

Figure 1:
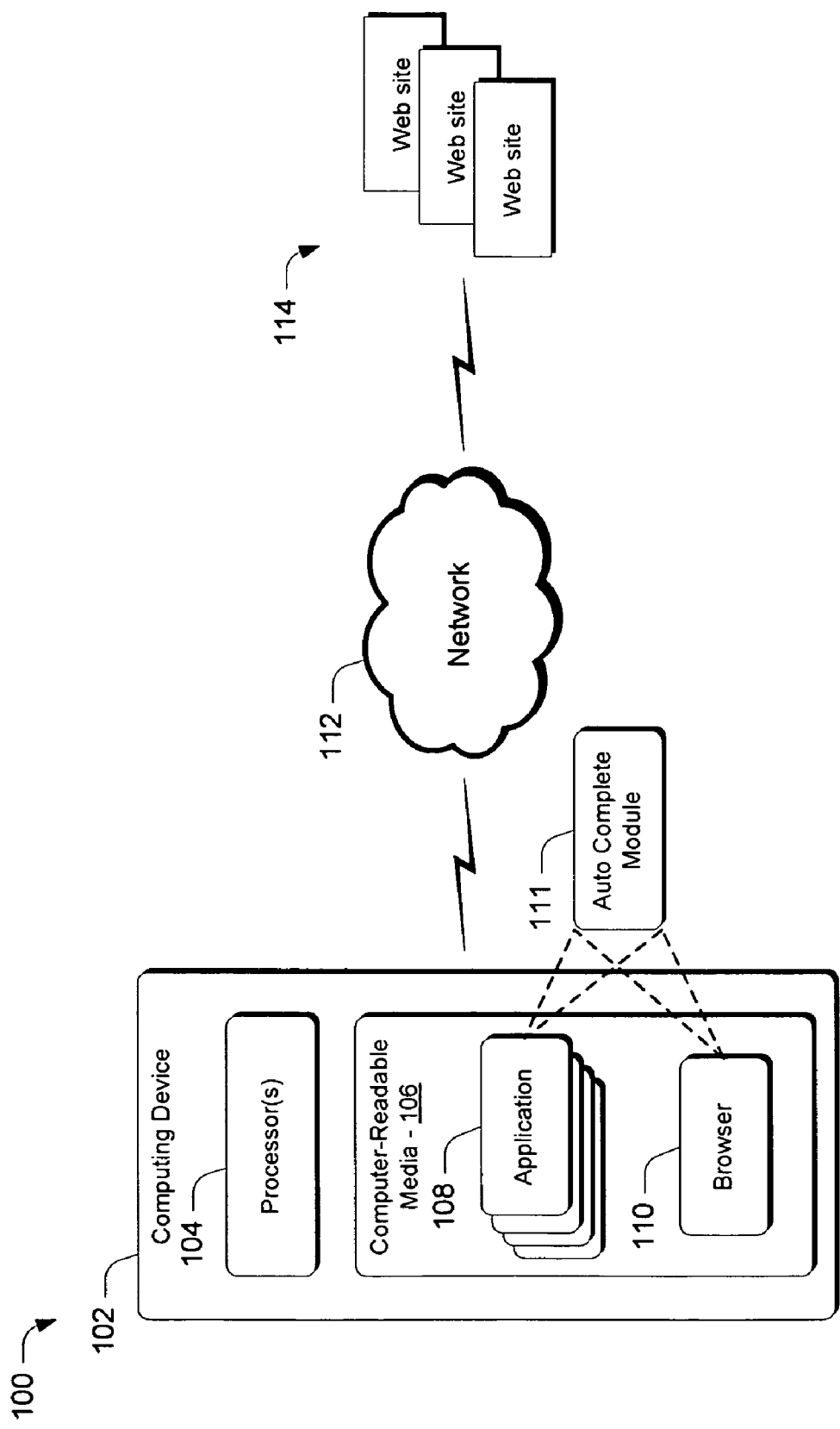
FIG. 1 illustrates a system in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable media 106 and one or more applications 108 of various types that reside on the computer-readable media and which are executable by the processor(s). The computer-readable media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 12.

In addition, computing device 102 includes a software application in the form of a web browser 110. Any suitable web browser can be used examples of which are available from the assignee of this document and others. In addition, computing device 102 includes an auto-complete module 111 that can operate as described above and below.

The auto-complete module can comprise a stand-alone component that is utilized by one or more of applications 108 and/or Web browser 110. Alternately or additionally, the auto-complete module can be integrated with one or more of applications 108 and/or Web browser 110. In various embodiments, application(s) 108 and/or web browser 110 are configured to utilize auto-complete module 111 to enable users to access site categories, content descriptions, level-associated content descriptions, and the like with less navigation than would normally be used to access such information.

In addition, environment 100 includes a network 112, such as the Internet, and one or more web sites 114 from and to which content can be received and sent.

Computing device 102 can be embodied as any suitable computing device such as, by way of example and not limitation, a desktop computer, a portable computer, a handheld computer such as a personal digital assistant (PDA), cell phone, and the like.

Having considered an example operating environment, consider now a discussion of an example embodiment.

Example Embodiment

Figure 2:
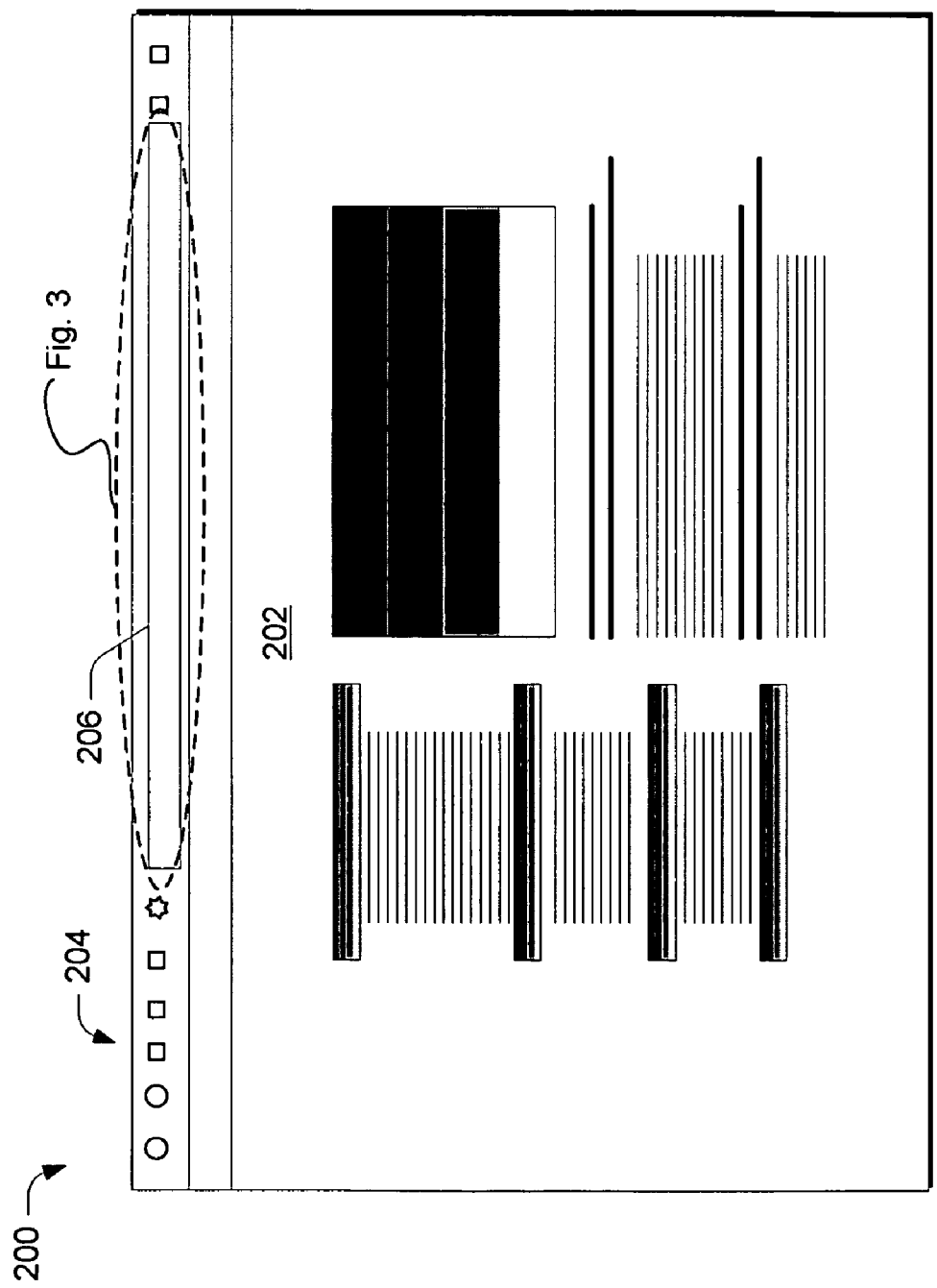
FIG. 2 illustrates an example user interface provided by a web browser.

FIG. 2 illustrates, generally at 200, a user interface in the form of a browser window that can be provided by a suitably-configured Web browser. In this example, user interface 200 includes an area 202 in which Web content can be rendered for the user. In addition, the user interface includes various navigation instrumentalities shown generally at 204 and an address bar 206 into which a user can type or enter various text such as URLs for different websites. In one or more embodiments, as a user types in or otherwise enters text in address bar 206, the auto-complete module, such as module 111 (FIG. 1), can retrieve a site index file or site map for an associated website and display, for the user, a description of a webpage's content as defined in the site index file or site map. In at least some embodiments, this can be done independent of and/or without navigating to a particular website.

As an example, consider FIG. 3 which illustrates the address bar 206 of FIG. 2. In this example, the user has entered text associated with the URL "www.yahoo.com". In at least some embodiments, a user can then take an associated action to cause the site index file or site map associated with the URL to be returned to the client application. As an example, consider FIG. 4 which uses like designators from FIG. 3.

There, the user has acted to enter a slash "/" as indicated at 400. Responsive to this user action, the client application which, in this case is a Web browser, can issue an HTTP "Get" request to the domain associated with the URL. The "Get" request can request the site index file or site map associated with that domain. Typically, such files are stored in standard locations and are named in conventional ways, as will be appreciated by the skilled artisan. For example, often times these files are stored in the root directory at a particular site.

Responsive to issuing the "Get" request, the site index file or site map is returned to the client application. In one or more embodiments, a site owner can configure their site index file or site map to include any suitable type of information that can be rendered by a client application. For example, site owners can define their site's content structure by level or hierarchy. So, for example, the site index file might identify all top-level categories and then, for each top-level category identified, a first sub-level. In addition, site owners can provide descriptive text or other information that can be displayed along with the various top level and sub-level categories. For example, the descriptive text can provide a description of what is available at a particular level. Other information that can be included in the site index file can include, by way of example and not limitation, various images such as favicons that can identify a particular level or sub-level.

As shown in FIG. 4, a drop-down menu 401 is presented and displays a top level of the website's content structure at 402. In this particular example, the top level includes a "/finance" level, a "/news" level, a "/music" level, a "/movies" level, and a "/maps" level. In addition, in this particular example, the site index file also includes descriptive text 404 that can provide a description of what is available at a particular associated level. For example, for the top level "/music", descriptive text informs the user that this level includes Internet radio, music videos, artists, music news, interviews and performances.

In at least some embodiments, the above-described information can be presented to the user without the user navigating to a particular site. This can provide valuable information to the user to then enable the user to make an intelligent decision as to how and where to navigate next.

Figure 5:
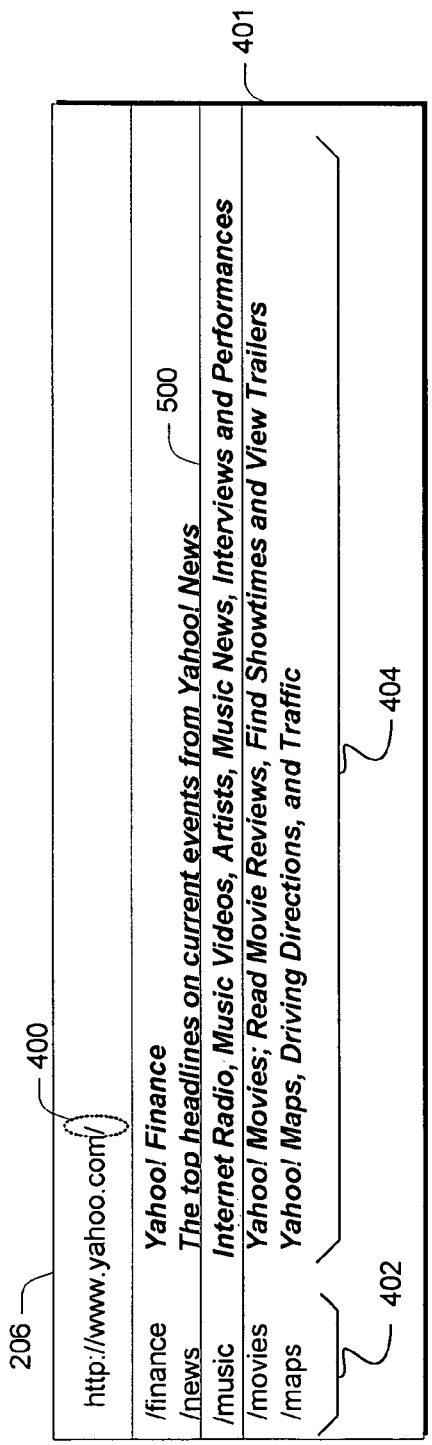
FIG. 5 illustrates the FIG. 4 address bar in accordance with one or more embodiments.

In one or more embodiments, once drop down menu 401 is displayed, the user can take one or more actions associated with the items that appear in the drop-down menu. For example, the user can simply ignore the items and continue typing in the address bar. Alternately or additionally, the user can highlight the particular item appearing in the drop-down menu and select one of the options to navigate to that particular website's level. Accordingly, in this example, the user is relieved from having to navigate to the primary website. Rather, they can navigate into deeper levels of the website as a first navigation activity. Alternately or additionally, the user can highlight a particular displayed item and further take additional actions to see deeper results within that particular item. As an example, consider FIG. 5 which uses previously-used designators.

Figure 6:
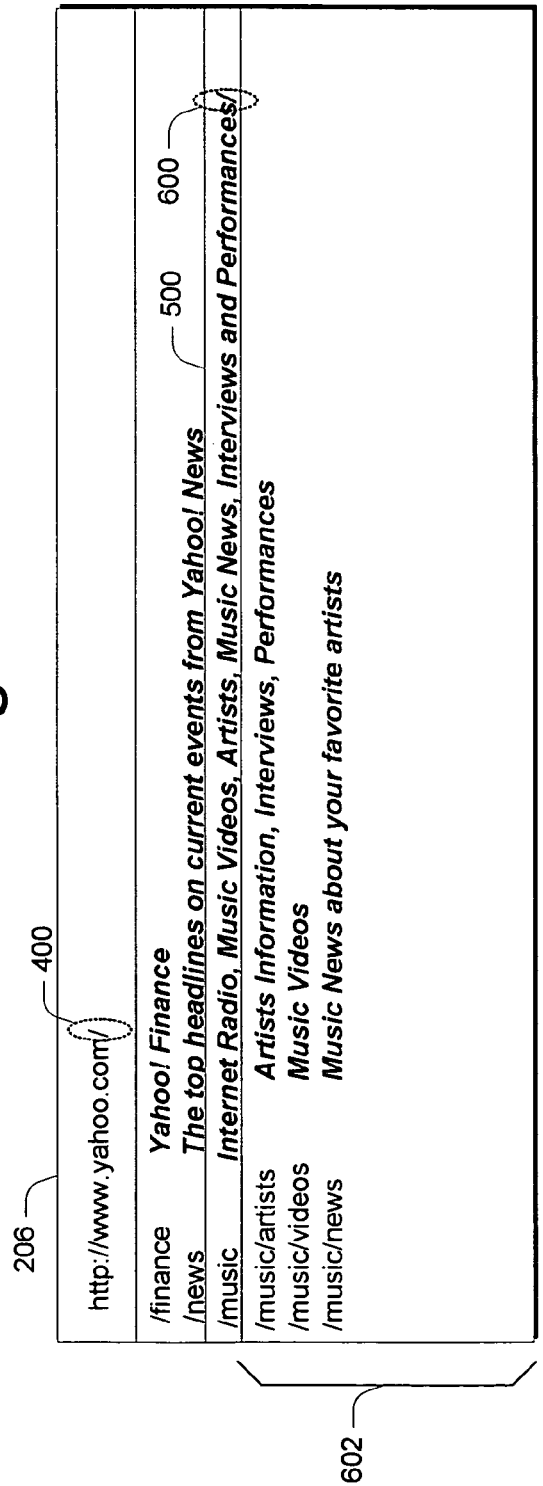
FIG. 6 illustrates the FIG. 5 address bar in accordance with one or more embodiments.

There, the user has highlighted the "/music" item as indicated at 500. Referring to FIG. 6 (which uses previously-used designators), the user has entered a "/" as indicated at 600. Responsive to this user action and in accordance with one or more embodiments, the client application can issue another "Get" request to receive an additional site index file or site map that describes levels appearing under the "/music" level. Specifically, in this example, an additional drop down menu 602 can be displayed for the user. In this particular example, the sub-levels that are displayed include a "/music/artists" level, a "/music/videos" level, and a "/music/news" level. Additionally, in this particular example, descriptive text is provided for individual sub-levels to provide the user with a description of what can be found at a particular sub-level.

Figure 7:
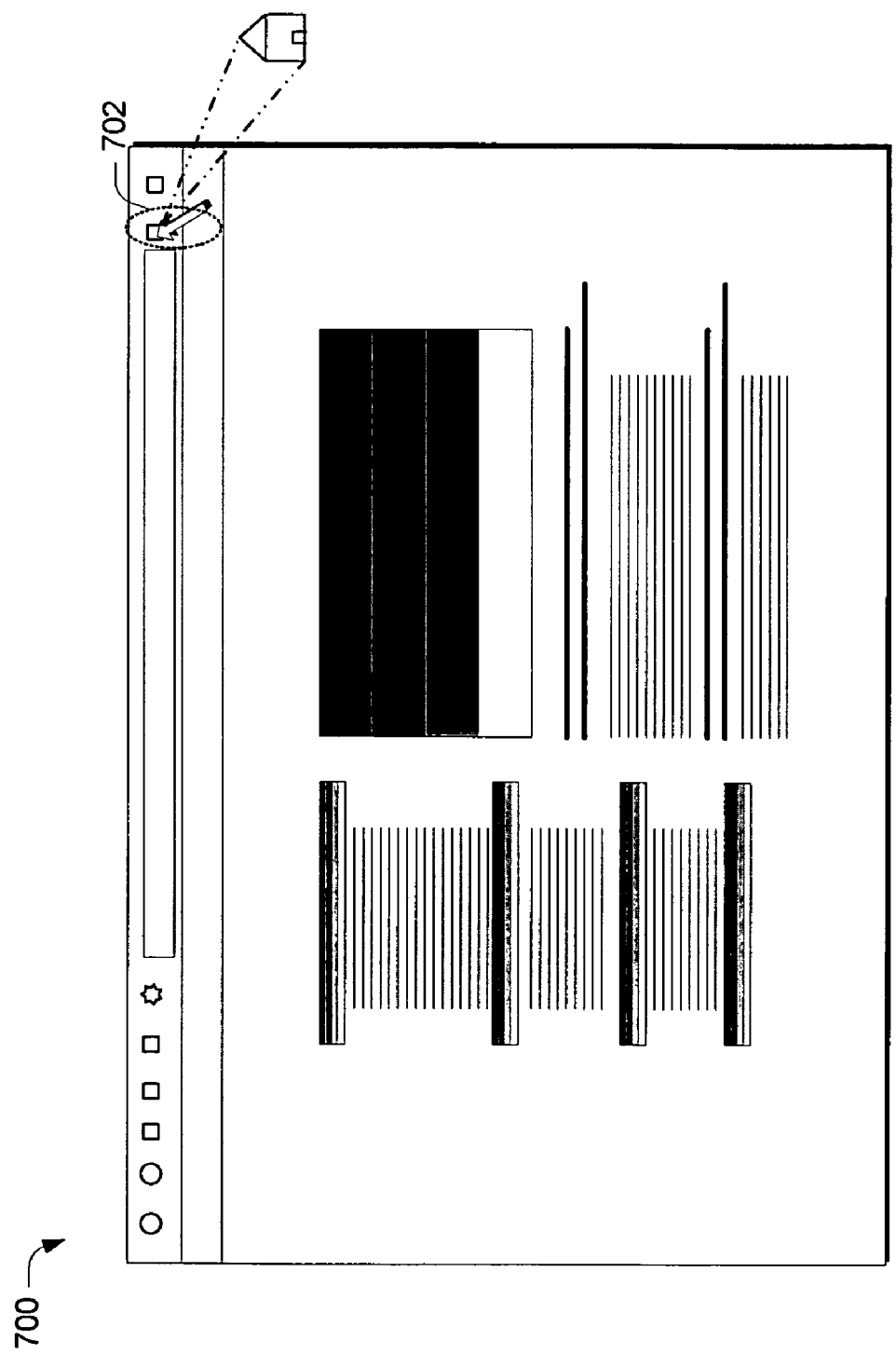
FIG. 7 illustrates a user interface in accordance with one or more embodiments.

The above-described example illustrates the use of an auto-complete module in the context of a web browser's address bar. It is to be appreciated and understood, however, that the functionality provided by the auto-complete module can be utilized in other contexts within the Web browser and/or with other applications. As an example, consider FIG. 7.

Figure 8:
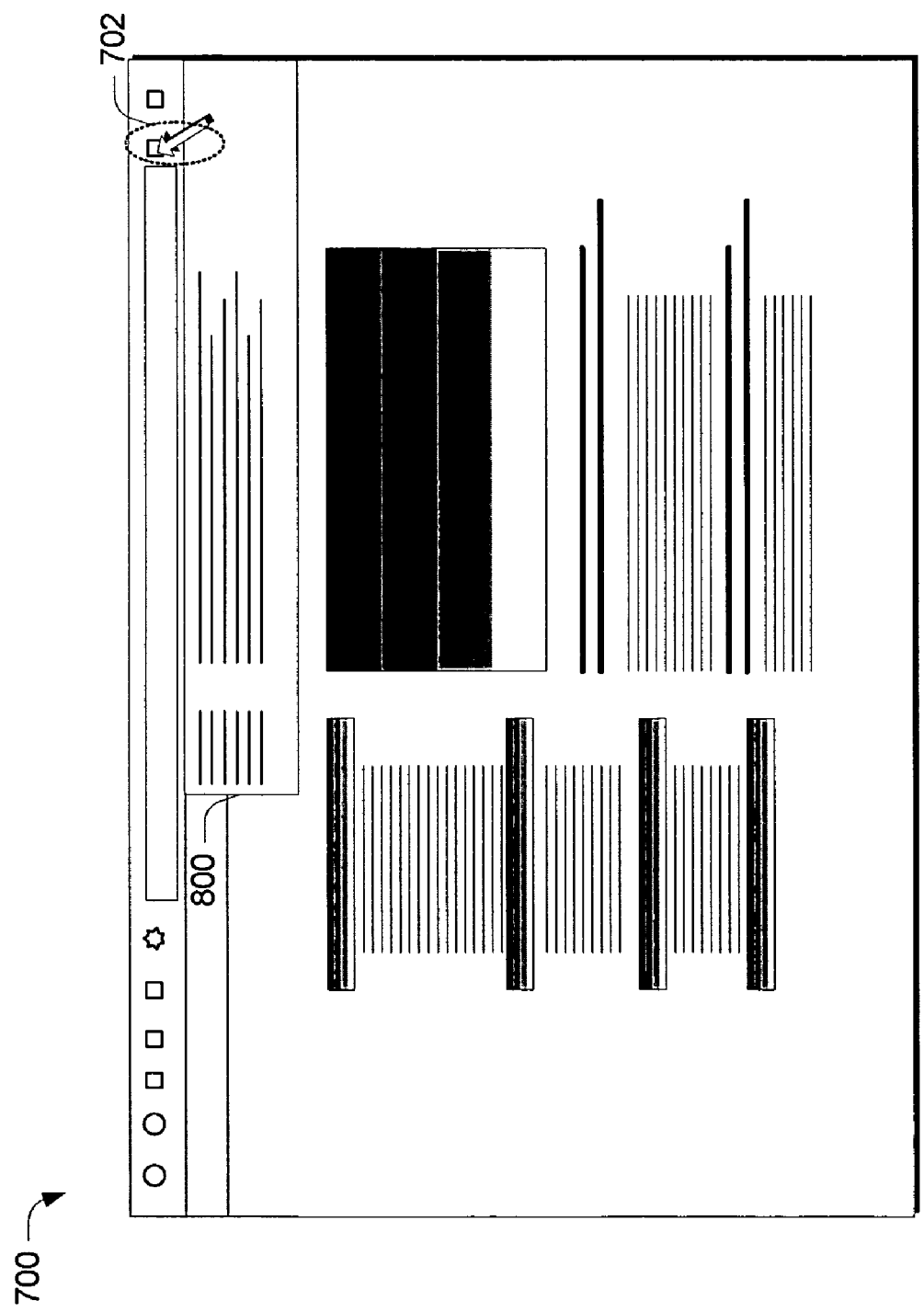
FIG. 8 illustrates the FIG. 7 user interface in accordance with one or more embodiments.

There, a user interface in the form of a web browser window is illustrated generally at 700. In this particular example, the user has hovered their cursor over or near an instrumentality in the Web browser window. The instrumentality can comprise any suitable instrumentality that can appear in a Web browser window. In this example, the instrumentality is a "home" icon that appears in the browser window. Responsive to hovering their cursor over this instrumentality, a drop-down menu can be presented that describes the user's homepage content in a manner described above. As an example, consider FIG. 8 which uses previously-used designators.

There, a drop-down menu 800 is provided which describes various levels and/or sub levels associated with a user's homepage. In much the same way that the user can navigate to the different levels or receive additional information as presented relative to the address bar above, so too can a user navigate or receive additional information using drop down menu 800.

As noted above, the auto-complete module can be used in connection with other applications as well. As an example, consider FIG. 9.

Figure 10:
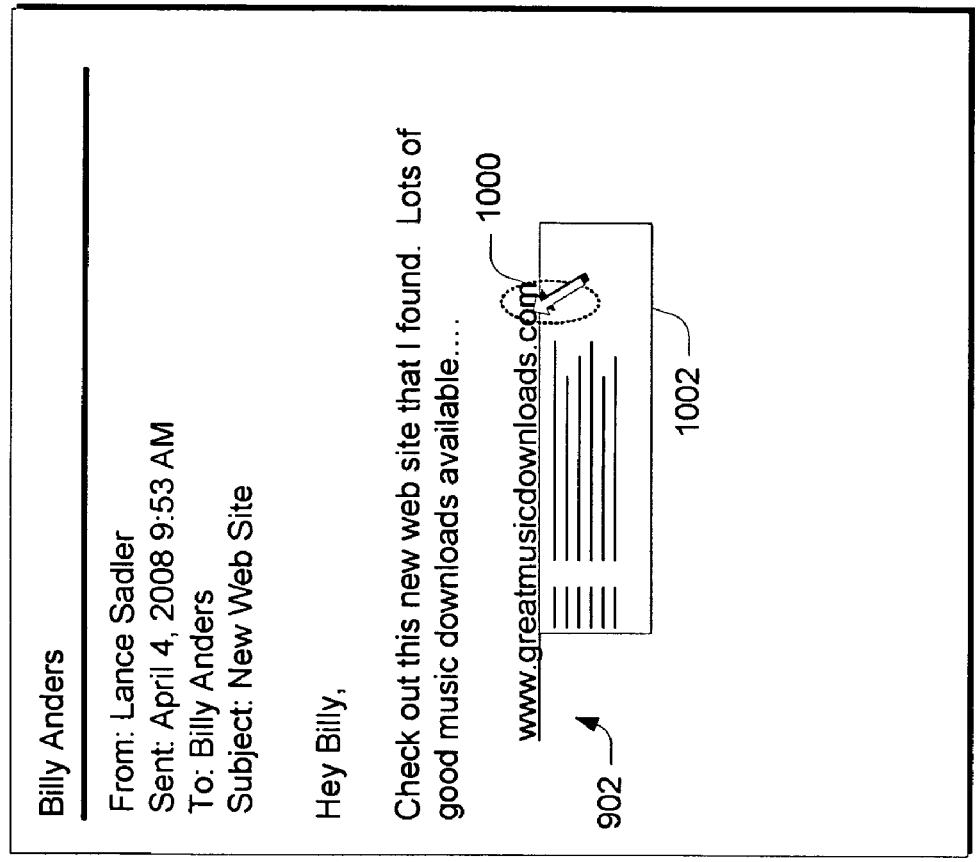
FIG. 10 illustrates the FIG. 9 user interface in accordance with one or more embodiments.

There, a user interface in the form of an e-mail message 900 is displayed. In this particular example, the e-mail message includes a link 902 to a website that is recommended to the recipient of the e-mail. Referring to FIG. 10 (which uses previously-used designators), the user has hovered their cursor over or near the link as shown at 1000. Responsive to hovering their cursor, the e-mail client application can issue a "Get" request to retrieve a site index file or site map associated with the link. Responsive to receiving the site index file or site map, a drop down menu 1002 can be presented to the user in which various levels associated with the link can be displayed for the user. The user can then, in much the same way as described above, navigate through or receive additional information associated with the various levels to access content associated with the link or website.

Having considered the various embodiments that can utilize the functionality provided by the auto-complete module, consider now an example method can be implemented in accordance with one or more embodiments.

Example Method

FIG. 11 is a flow diagram that describes steps in a method in accordance with one or more embodiments. The method can be implemented in connection with any suitable hardware, software, firmware or combination thereof. In at least some embodiments, aspects of the method can be implemented by a suitably configured client application and/or auto-complete module such as that described above. In addition, some aspects of the method can be implemented by a website. Accordingly, in the illustrated flow diagram, steps that can be implemented by a client application and/or auto-complete module are designated as such. Likewise, steps that can be implemented by a website are designated as such.

Step 1100 receives a user action associated with a website. Any suitable user action can be used. For example, in at least some embodiments a user action can include entering text into a suitably-configured text area. One example of a suitably-configured text area is an address bar. Other text areas can include, by way of example and not limitation, a favorites bar, a search bar, and the like. In embodiments in which a user enters text, the user action can further include entering a text character of a particular type. In the address bar example above, such character comprises a "/" character. Any suitable character, however, can be used. Alternately or additionally, a user action can include hovering a cursor over or near an associated link. It is to be appreciated and understood, however, that any suitable user action can be used. For example, in at least some embodiments, a voice-based embodiment can support user actions that include audibly providing, as by speaking into a suitably configured input device, an input such as a URL.

Step 1102 generates, responsive to the user action, a request for a site index file or site map. Any suitable request can be utilized. In at least some embodiments, the request can be generated in accordance with standard protocols. One example of such a request is an HTTP "Get" request. Step 1104 sends the request to the website.

Step 1106 receives the request and step 1108 returns the site index file or site map to the client application.

Step 1110 receives the site index file or site map and step 1112 renders a presentation describing the website's content. Any suitable presentation can be used for describing the website's content. In at least some embodiments, the presentation can reside in the form of a display that can reside in the form of a drop down menu. Other displays can be utilized without departing from the spirit and scope of the claimed subject matter. Alternately or additionally, the presentation can comprise an audible presentation, such as a verbalization of the returned website content.

In at least some embodiments, steps 1100-1112 can be repeated for subsequently presenting deeper content within the web site.

Having described an example method in accordance with one or more embodiments, consider now an example system that can be utilized to implement one or more of the above-described embodiments.

Example System

FIG. 12 illustrates an example computing device 1200 that can implement the various embodiments described above. Computing device 1200 can be, for example, computing device 102 of FIG. 1 or any other suitable computing device.

Computing device 1200 includes one or more processors or processing units 1202, one or more memory and/or storage components 1204, one or more input/output (I/O) devices 1206, and a bus 1208 that allows the various components and devices to communicate with one another. Bus 1208 represents one or more of any of several types of bus structures, including a memory bus or memory controller, a peripheral bus, an accelerated graphics port, and a processor or local bus using any of a variety of bus architectures. Bus 1208 can include wired and/or wireless buses.

Memory/storage component 1204 represents one or more computer storage media. Component 1204 can include volatile media (such as random access memory (RAM)) and/or nonvolatile media (such as read only memory (ROM), Flash memory, optical disks, magnetic disks, and so forth). Component 1204 can include fixed media (e.g., RAM, ROM, a fixed hard drive, etc.) as well as removable media (e.g., a Flash memory drive, a removable hard drive, an optical disk, and so forth).

One or more input/output devices 1206 allow a user to enter commands and information to computing device 1200, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments utilize an auto-complete module to expose a website's content structure. In at least some embodiments, a user can take an action within an application and, responsively, the auto-complete module can retrieve a site index file or site map and use the site index file or site map to display the website's content structure. In at least some embodiments, a website's content structure can be displayed without navigating to the particular website.

In at least some embodiments, the auto-complete module can utilize standard protocols such as HTTP protocols to retrieve the site index file or site map.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
    retrieving, via a request to a website and without navigating to the website, a site index file or site map associated with the website, responsive to a user action; and
    using, without navigating to the website, the site index file or site map to present content structure displayed in a user interface menu with level categories that comprise a plurality of top levels of the website along with corresponding descriptions that describe content available at associated top levels, responsive to the user action to present the user interface menu at a particular level of the content structure.

2. The method of claim 1, wherein the request to a website comprises an HTTP Get request.

3. The method of claim 1, wherein the user action comprises entering text into an application.

4. The method of claim 1, wherein the user action comprises entering text into a web browser.

5. The method of claim 1, wherein the user action comprises entering text into an address bar associated with a web browser.

6. The method of claim 1, wherein the user action comprises entering a "/" into an address bar associated with a web browser.

7. The method of claim 1, wherein said using displays descriptive text that provides a description of what is available at a particular level.

8. The method of claim 1, wherein said user interface menu is a dropdown menu in which said content structure is displayed.

9. A computer implemented method comprising:
    retrieving, via a request to a website and without navigating to the website, a site index file or site map associated with the website, responsive a user action comprising at least one of:
        (1) a user entering text in a box presented by an application,
        (2) a user hovering a cursor over or near an instrumentality or link; or
        (3) a user providing audible input; and
    using the site index file or site map to present a top level content structure associated with the website, wherein said using displays a plurality of top level categories in a drop down menu in association with corresponding descriptions that describe content available at associated top level categories, responsive to the user action to present the drop down menu having the content structure.

10. The method of claim 9, wherein said using is performed without navigating to the website.

11. The method of claim 9, wherein said box comprises an address bar.

12. The method of claim 9, wherein said user action takes place within a web browser.

13. The method of claim 9, wherein said user action takes place within an application other than a web browser.

14. The method of claim 9, wherein said user action takes place within an email application.

15. A system comprising:
    one or more computer-readable storage media;
    computer-readable instructions on the one or more computer-readable storage media, which, when executed, implement a method comprising:
        retrieving, via a request to a website and without navigating to the website, a site index file or site map associated with the website, responsive to a user action;
        using the site index file or site map to display a content structure of top levels of the website in a corresponding drop down menu responsive to the user action to present the content structure at a top level;
        receiving a further user action associated with an item that appears in the drop down menu;
        retrieving an additional site index file or site map responsive to said further user action; and
        using said additional site index file or site map to display further content structure associated with a sub-level of the website,
        wherein said retrieving an additional site index file or site map and using said additional site index file or site map are performed without navigating a browser window to the website.

16. The system of claim 15, wherein at least one of said user actions comprises entering text into the browser.

17. The system of claim 15, wherein at least one of said user actions comprises entering text into an address bar associated with the browser.

18. The system of claim 15, wherein at least one of said (1) using the site index file or site map or (2) using said additional site index file or site map displays descriptive text that provides a description of what is available at a particular level.

19. The system of claim 15, wherein at least one of said user actions comprises hovering a cursor over or near a browser instrumentality or link.

20. The system of claim 15, wherein at least one of said acts of retrieving a site index file or site map, using the site index file or site map, receiving a further user action, retrieving an additional site index file or site map, and using said additional site index file or site map is performed by an auto-complete module that is integrated with the browser.

\* \* \* \* \*